United States Patent

Woytowitz et al.

[11] Patent Number: 5,444,611
[45] Date of Patent: Aug. 22, 1995

[54] LAWN AND GARDEN IRRIGATION CONTROLLER

[75] Inventors: Peter J. Woytowitz, San Diego; Burton L. Munger, IV, San Marcos; Scott W. Randolph, Vista; Larry K. Hopkins, Escondido; Donald L. Kreisher, Vista, all of Calif.

[73] Assignee: Hunter Industries, Inc., San Marcos, Calif.

[21] Appl. No.: 144,580

[22] Filed: Oct. 28, 1993

[51] Int. Cl.⁶ ............................................. G06F 19/00
[52] U.S. Cl. ................................. 364/145; 137/624.2; 239/69; 364/420
[58] Field of Search ............... 364/145, 143, 144, 146, 364/420, 509, 510, 188, 189; 239/63, 67–70; 137/624.11–524.2

[56] References Cited

U.S. PATENT DOCUMENTS

| | | | |
|---|---|---|---|
| 4,165,532 | 8/1979 | Kendall et al. | 364/145 X |
| 4,176,395 | 11/1979 | Evelyn-Veere et al. | 364/145 X |
| 4,646,224 | 2/1987 | Ransburg et al. | 364/145 X |
| 4,745,543 | 5/1988 | Michener et al. | 364/188 |
| 4,937,732 | 1/1990 | Brundisini | 364/145 |
| 5,097,861 | 3/1992 | Hopkins et al. | 137/78.3 |
| 5,229,937 | 7/1993 | Evelyn-Veere | 364/420 |
| 5,239,458 | 8/1993 | Suzuki | 364/188 |

OTHER PUBLICATIONS

Rain Bird ESP Series Controllers, one page technical specification; Date Unknown.

*Primary Examiner*—Joseph Ruggiero
*Attorney, Agent, or Firm*—Baker, Maxham Jester & Meador

[57] ABSTRACT

An improved irrigation controller is provided for selectively turning ON and OFF each of a plurality of sprinkler valve stations around a lawn or garden. The controller permits direct entry on a station-by-station level of the run time, number of cycles, and frequency of operation. The controller then permits both start time and no water days to be entered globally.

10 Claims, 4 Drawing Sheets

LAWN AND GARDEN IRRIGATION CONTROLLER

BACKGROUND OF THE INVENTION

The present invention relates to irrigation, and more particularly, to an improved electronic irrigation controller adapted primarily for lawn and garden irrigation which is easier to program and more flexible than prior irrigation controllers.

Most lawn and garden irrigation controllers which have heretofore been commercialized have depended upon "programs" which have been set up by the operator to initiate watering times at particular valve stations at a certain time of the day. The length of the watering cycle or run time must somehow be calculated by the operator and entered into the controller for each station. This may involve calculating two or more start times per station per day. This process is often complicated by confusing and cumbersome controller keyboards, entry switches, and operational programs. Even the most sophisticated solid state irrigation controllers have utilized several switches and indicators which often have multiple functions assigned to them.

A significant advance in the irrigation controller field is disclosed in U.S. Pat. No. 5,097,861 of Hopkins, et al. entitled "IRRIGATION METHOD AND CONTROL SYSTEM". That patent is assigned to Hunter Industries of San Marcos, Calif., the assignee of this patent application. The irrigation controller of said U.S. Pat. No. 5,097,861 can be programmed with a non-watering period for each watering station to thereby determine an available watering period for each watering station. Each watering station is thereafter only actuated within its corresponding available watering period in accordance with stored monthly mean temperature and evapotranspiration rates for the ZIP Code location of the irrigation controller. The input from a rain gauge connected to the irrigation controller can cause the watering schedules to either be suspended or recalculated. The irrigation controller of Hopkins, et al. also uses a signal from a thermometer as a factor in calculating sprinkler valve ON time. A single rotary switch which may also be pressed is utilized to program the irrigation controller through a hierarchy of menu structures shown on an LCD display. While the irrigation controller of said U.S. Pat. No. 5,097,861 has been a commercial success, it has been determined that further advancements in the irrigation controller art would be beneficial to homeowners, business property owners, apartment owners and golf course owners, desiring easier programming and more flexible capabilities.

SUMMARY OF THE INVENTION

It is therefore the primary object of the present invention to provide an improved irrigation controller primarily adapted for lawn and garden irrigation which is easier to program and more flexible than prior irrigation controllers.

It is another object of the present invention to provide an improved irrigation controller in which all of the parameters associated with any one sprinkler valve station are viewable from a single screen.

It is another object of the present invention to provide an improved irrigation controller which will permit a rapid seasonal adjust and which will display the new run time for each sprinkler valve station.

It is another object of the present invention to provide an improved irrigation controller that will display the degree of seasonal adjust via bar graph.

It is another object of the present invention to provide an improved irrigation controller that utilizes a cursor control to "walk" the operator around a plurality of displayed information fields and lists of items.

It is another object of the present invention to provide an improved irrigation controller with the ability to display what day a sprinkler valve station will water next.

It is another object of the present invention to provide an improved irrigation controller which permits the operator to block irrigation on a specific day or days of the week which are referred to herein as "no water days".

It is another object of the present invention to provide an improved irrigation controller which allows the operator to set a single start time and will then automatically calculate the schedule with all the repeat cycles.

It is another object of the present invention to provide an improved irrigation controller which permits the operator to enter a specific number of cycles for a sprinkler valve station instead of requiring the operator to enter subsequent start times.

It is another object of the present invention to provide an improved irrigation controller which will delay one programmed watering schedule until an earlier programmed watering schedule has been completed.

It is another object of the present invention to provide an improved irrigation controller which will permit the operator to water manually even if a rain sensor is active.

According to the present invention, an improved irrigation controller is provided for selectively turning ON and OFF each of a plurality of sprinkler valve stations located around a lawn or garden. The controller includes a keyboard for permitting manual entry of a plurality of commands for programming a start time, run time, and frequency of operation of each of the sprinkler valve stations. The irrigation controller further includes a processor connected to the keyboard for receiving the commands and for energizing and de-energizing each of the plurality of sprinkler valve stations in accordance with the corresponding programmed start time, run time and frequency. A display is connected to the processor means for indicating the start time, run time and frequency of operation of each of the sprinkler valve stations with a plurality of alphanumeric signs. Plus and minus seasonal variance commands can be entered through the keyboard for programming increments and decrements to the run time of all of the sprinkler valve stations by a predetermined amount. The display indicates the programmed seasonal variance with a bar graph and displays a new run time for each sprinkler station resulting from the programmed seasonal variance. Through the keyboard, the operator can move a cursor through a plurality of corresponding information fields and lists of items which are indicated on the display. The operator can enter numeric and item commands such as start time and number of cycles as well make item selections through the keyboard. In addition, "no water days" can be commanded through the keyboard. The improved irrigation controller includes automatic program overlap protection that results in the delay of the start time of any sprinkler valve station when a last run time for the same station for a given day runs past the start time of that station on the next day.

DETAILED DESCRIPTION OF THE PREFERRED EMBODIMENT

Figure 1:
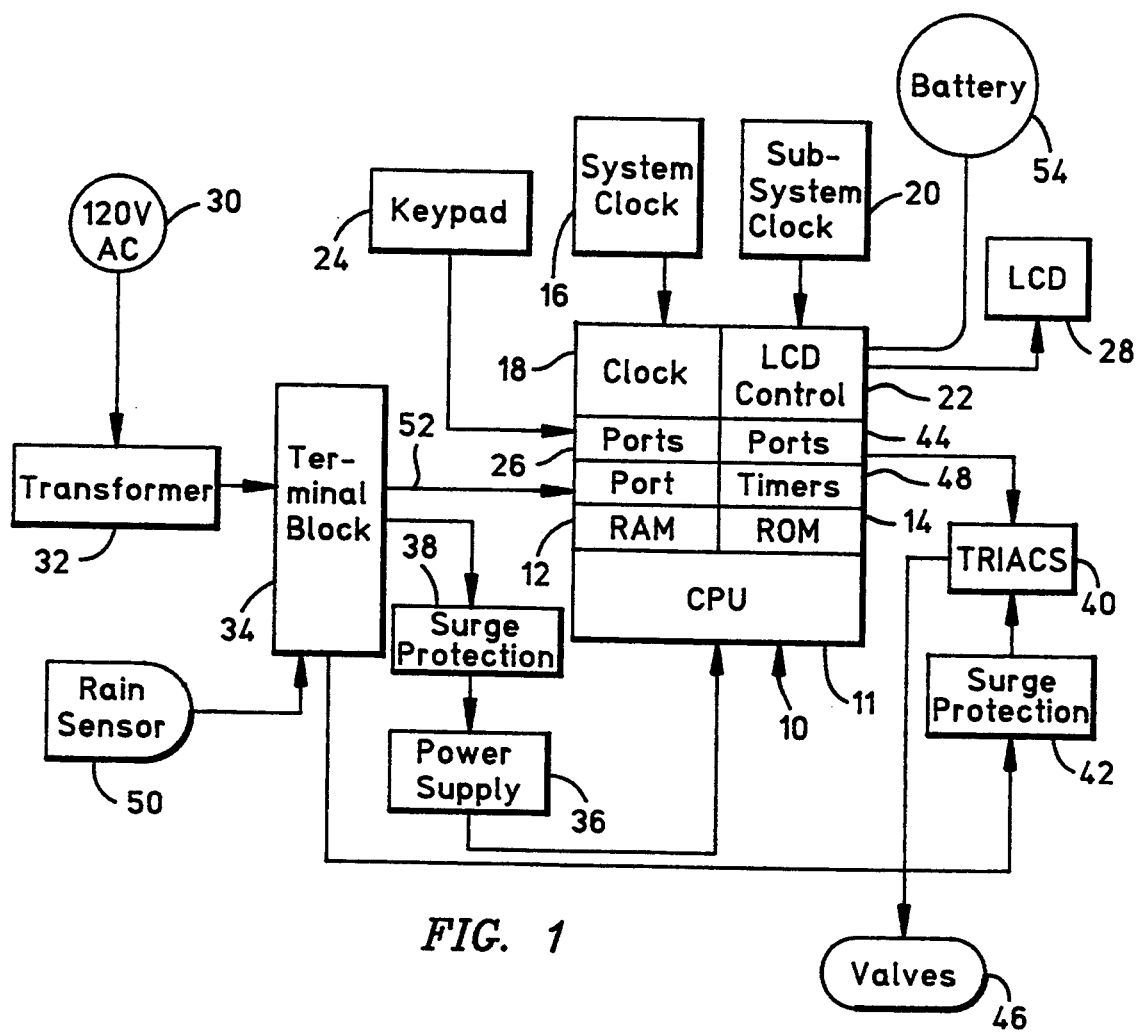
FIG. 1 is a functional block diagram of the preferred embodiment of our improved irrigation controller.

Referring to FIG. 1, the preferred embodiment of our improved irrigation controller includes a microcomputer 10 in the form of an NEC 75306 integrated circuit. This is a CMOS device having a four bit CPU 11, 512×4K of RAM 12 and 12×8K of ROM 14. The RAM is used for data manipulation while the ROM physically stores operational software as firmware. An external system clock 16 which operates at 4.19 MHz is connected to an onboard clock circuit 18 of the microcomputer 10. An external subsystem clock 20 operating at 32.768 KHz is connected to an onboard LCD control circuit 22. A keypad 24 transmits scan signals to port numbers four and seven of the microcomputer 10 which are indicated diagrammatically at 26. The onboard LCD control circuit 22 of the microcomputer 10 is connected to a one-hundred segment LCD display 28.

Referring still to FIG. 1, power from a one-hundred and twenty volt AC source 30 is stepped down by a transformer 32 to a twenty-four volt AC signal which is connected to selected terminals of a terminal block 34, This twenty-four volt AC signal is connected to a power supply circuit 36 through a surge protection circuit 38. The power supply circuit 36 supplies five volts DC to the microcomputer 10.

Nine separate triacs collectively labeled as 40 in FIG. 1 are connected to the twenty-four volt AC signal from the terminal block 34 through another surge protection circuit 42. The microcomputer 10 has a plurality of output ports labeled 44 in FIG. 1. Port number five and six of the NEC 75306 microcomputer are each four bit ports. Port numbers five and six are used by the microcomputer 10 to selectively turn eight different triacs ON and OFF. These triacs energize eight corresponding sprinkler valves of a group of ten valves collectively labeled as 46 in FIG. 1. Another one of the output ports of the microcomputer 10, namely port 2.1, is used to switch a ninth triac which turns a ninth sprinkler valve ON and OFF. Port 3.1 of the microcomputer is used to switch another triac which turns a master valve ON and OFF. The master valve is upstream of the other nine sprinkler valves. It turns ON anytime any of the nine sprinkler valves is turned ON. Similarly, the master valve turns OFF when all of the nine sprinkler valves are turned OFF. The use of a master valve in this fashion makes it unnecessary to continuously pressurize the underground water pipes all the way to each of the sprinklers. This reduces the likelihood of leaks and other failures.

The microcomputer 10 (FIG. 1) also includes onboard timers 48 which are utilized in executing the operational software hereafter described. A rain sensor 50 is connected through the terminal block 34 and a lead 52 to port 1,1 of the microcomputer 10. The rain sensor 50 does not interrupt the valve common circuit as is the case with conventional rain sensors. Instead, the rain sensor 50 interfaces directly with the microcomputer 10. This provides two distinct improvements over the conventional method. First, it allows the fact that irrigation is being suspended due to rain to be displayed on the LCD 28. Second, it allows a quick and easy way to override the rain sensor by entering a manual watering command via keypad 24.

The LCD control circuit 22 (FIG. 1) is capable of driving a maximum of 128 segments (32 segments by 4 common segments) and operates in a quadraplax MUX mode. The system clock 16 comprises a ceramic oscillator in order to reduce the overall cost of the irrigation controller. The subsystem clock 20 comprises a crystal oscillator and is the main clocking device for the CPU 11 of the microcomputer 10. The system clock 20 has ten minutes or less of drift per year. The LCD display 28 is preferably of the transreflective type and measures approximately 0.75 inches by 3.0 inches in viewing area. Preferably, the LCD display employs a high durability polarizer (not illustrated) which increases the life expectancy of the display.

In the event failure of the one hundred and twenty volt AC power source 30 (FIG. 1), power to the microcomputer 10 is maintained by a nine-bolt battery 54. This battery will maintain current data in the RAM 12 and keep track of time for a minimum of one and one-half days. Each of the triacs 40 is capable of supplying the twenty-four volt AC signal to its corresponding valve with approximately twice the minimum current needed to actuate its solenoid. The surge protection circuits 38 and 42 employ MOV type surge suppression as is conventional in the irrigation controller field. Lightning protection circuity may also be added to the circuit of FIG. 1.

The electronic circuitry of FIG. 1 is preferably contained within an injection molded plastic housing (not shown) providing good weatherability and impact resistance. The preferred plastic is acrylonitrile/styrene/acrylate (ASA). The housing is designed to be resistant to direct spray by the sprinklers or rain. In order to accomplish this, the housing design incorporates molded mechanical water dams and snap seals. Water resistance is accomplished by overlapping the parting line of the main portion of the housing with its door which preferably has a fifteen degree downward tilt. The LCD display 28 is also preferably sealed inside the plastic housing.

Figure 2:
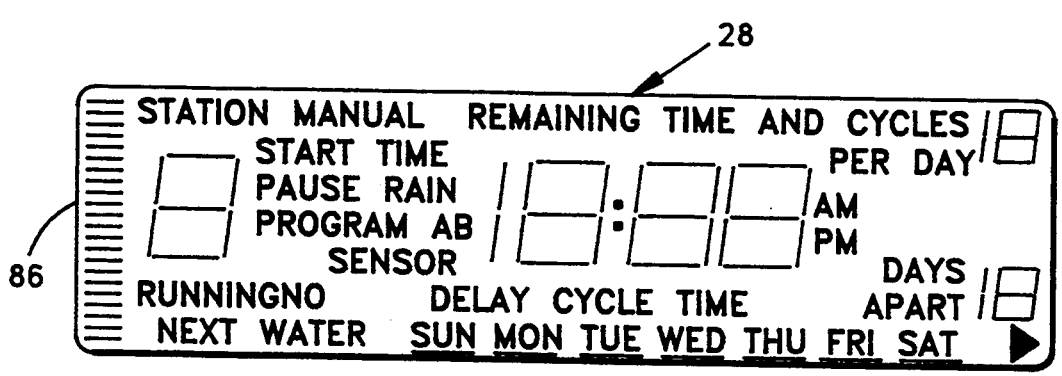
FIG. 2 illustrates the LCD layout of the preferred embodiment of our improved irrigation controller.

Referring to FIG. 2, the LCD display 28 is the primary focal point for the operator. The possible alphanumeric messages which the LCD display 28 can indicate are shown in FIG. 2. Only selected words and numbers are illuminated by the LCD control circuit 22 at any one time.

Figure 3:
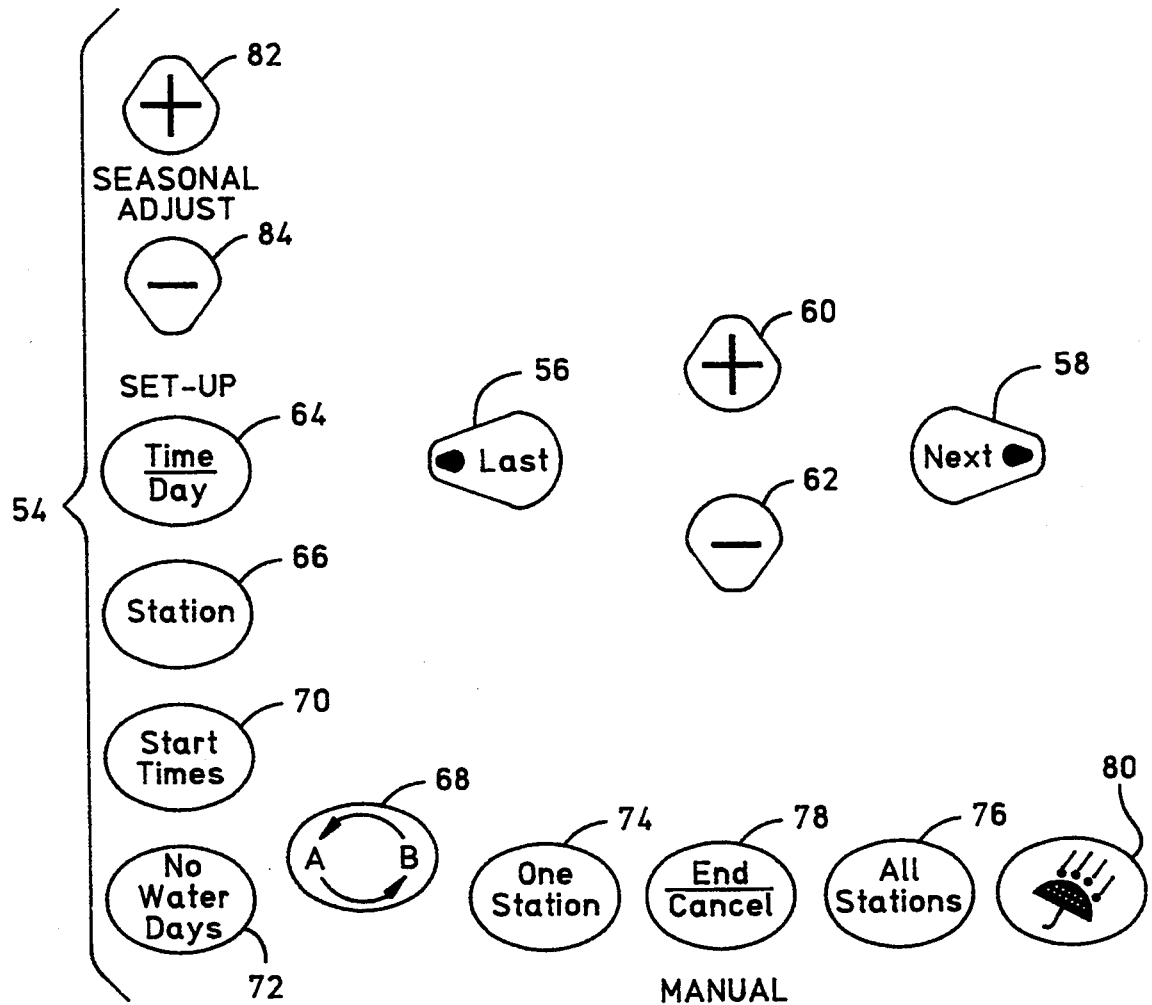
FIG. 3 illustrates the keyboard layout of the preferred embodiment of our improved irrigation controller.
Figure 4:
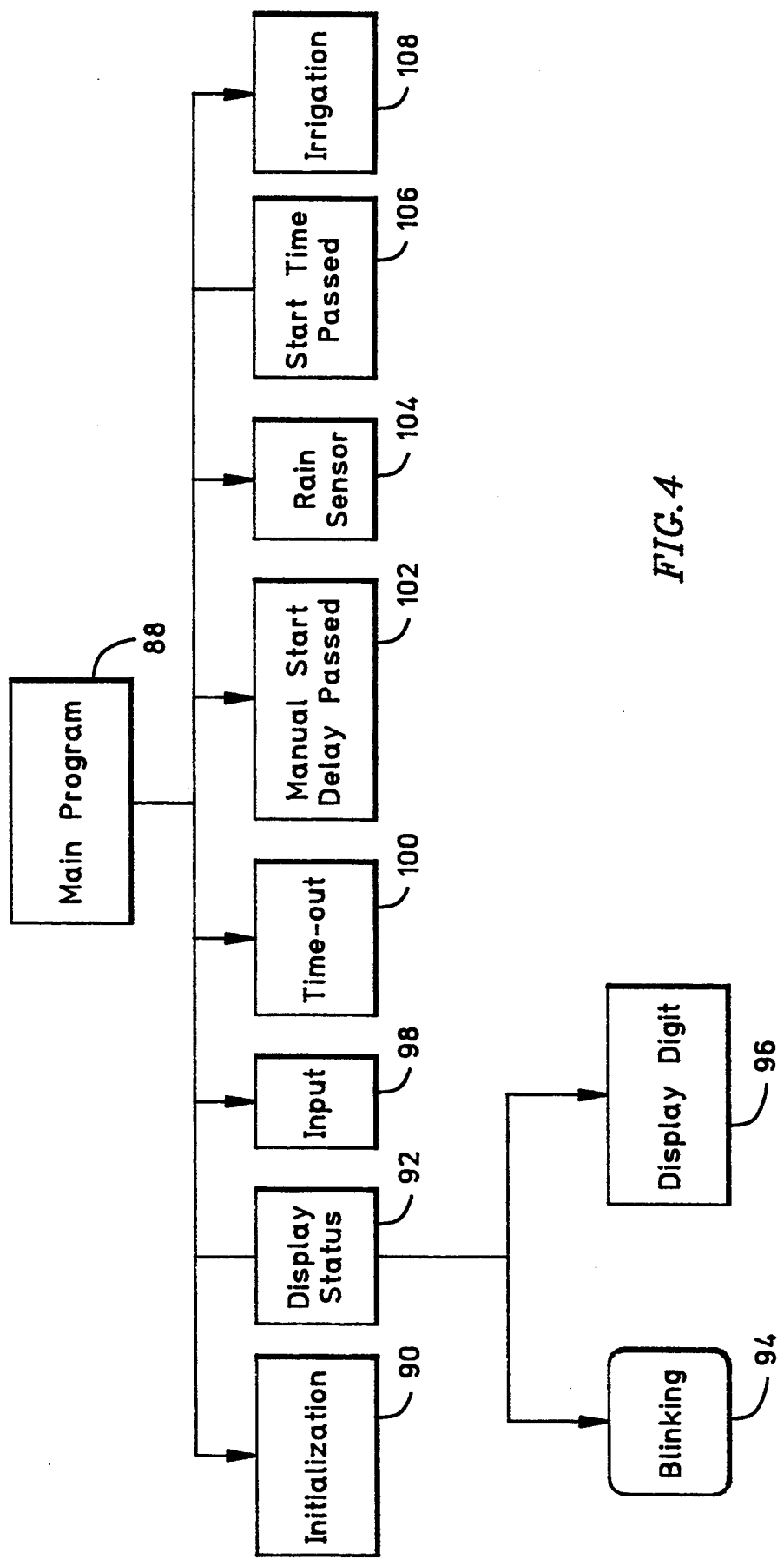
FIGS. 4–7 are flow diagrams illustrating the architecture of the software executed by the preferred embodiment of our improved irrigation controller.

FIG. 3 illustrates the layout of a plurality of keys 54 of the keypad 24. The keys may be selectively depressed by an operator to move a cursor around to program various functions and to change the numerical values indicated in the LCD display 28.

The keypad 24 includes fifteen individually actuable conductive rubber keys 54 which are preferably compression molded as one pad. Each key has one cylindrical graphite pill attached thereto that will make contact with a trace pad on a facing printed circuit board portion of the keypad to provide scan signals to ports 26

(FIG. 1) of the microcomputer 10. Collectively, the rubber keys, cylindrical grafite pills and mating printed circuit board provide fifteen separate pushbutton switches.

The LAST and NEXT keys 56 and 58 may be depressed to move the cursor, or the field of information or item in a list on the LCD display 28 to the previous or next field or item in a list. A flashing data item indicates the location of the cursor. The sequence is arranged so that pressing the NEXT key 58 generally progresses to the right, or clockwise, while pressing the LAST key 56 generally progresses to the left or counterclockwise.

The "+" and "−" keys 60 and 62 increase or decrease numeric values, or select and de-select items in a list. The "TIME/DAY" key 64 allows the operator to set the time of day by independently changing the hours, minutes, and am/pm indicator. It also allows direct setting of the day of the week. The default values are 12:00 a.m. and Sunday. These default values will appear and flash during power-up of the circuit. After they have been changed, they will no longer flash.

The "STATION" key 66 allows the operator to set or review those parameters associated with a particular valve station. The parameters associated with each valve station are run time, repeat cycles, and watering interval. Each valve station may have a separate set of these parameters for each of two programs, namely the A program and the B program. The operator depresses the STATION key 66, then depresses the A/B key 68 to select the program, and then depresses the LAST key 56 or NEXT key 58 to move the cursor to select a particular valve station. This station's parameters will be displayed on the LCD display 28 and may be changed using the LAST and NEXT keys 56 and 58.

Once a station has been selected, the operator may set the length of time that the selected valve station will run (for each repeat cycle). Hours and minutes may be entered independently of each other using the "+" and "-" keys 60 and 62. The maximum allowable run time is three hours and fifty-nine minutes. The default run time is six minutes and the default number of cycles is three. These default values result in eighteen total minutes of watering which is based on a daily evapotranspiration rate of 0.25 and a precipitation rate of 0.75.

Once a valve station has been selected, the operator may enter the cycles per day. Here the operator sets the number of cycles per watering day for the particular valve station which has been selected. The valve station will run for the amount of time that was entered as the run time, for each of these cycles. The minimum period of time between cycles is known as cycle delay time. The maximum number of repeat cycles is fourteen. The default number of cycles is three. Once a valve station has been selected, the operator can set the number of days between watering for that valve station. If the value is one, then the valve station will water every day. If the value is two, the station will water every other day, and so on. The maximum value for the number of days between watering for a valve station is fourteen days. Watering will occur on the first water day after the number of days specified has elapsed unless there is a no water day. The default value for the watering interval is one day which will result in every day watering.

Depressing the "START TIMES" key 70 allows the operator to set the time of day when irrigation, if any, will begin. There is one start time for the A program and one start time for the B program for the entire set of valve stations. There is independent entry of hour, minute and a.m./p.m. via the keys 56, 58, 60 and 62. If there is no irrigation scheduled for the day because of the watering interval, or a no water day, or a rain off condition, no stations will run. At the indicated start time, the first station with any run time that is scheduled for that day will run, and the other stations/cycles will follow. The default start time for program A is 1:00 a.m. The reasoning behind this default value is the fact that watering restrictions often prohibit watering after 7:00 a.m., and the default schedule will not run past this time. It also assures that watering will not overlap into the next day which can confuse the operator with regard to no water days. The default start time for program B is 0:00. This means program B will not run. Anytime 0:00 is entered as a start time, that program is disabled. If both start times are set to the same time, program B's start time will be delayed until program A has been completed. If the programs overlap, then the second program will be delayed until the first program has ended.

The cycle delay time is the minimum amount of time which must pass between when a valve station completes one cycle and when that same valve station can begin its next cycle. This parameter affects all of the valve stations. In the preferred embodiment of our irrigation controller, the cycle delay time if one-half hour.

The NO WATER DAYS key 72 may be depressed by the operator to set the days of the week that irrigation is not allowed to occur. That is, no irrigation occurs at the start time of a "no water day". The concept is that the operator is more concerned with the days that irrigation should not occur than with days that it will occur. This allows a rapid way to disable watering for yard work days, drying out before mowing, and so on. It also saves setup time since there should be fewer "no water days" than "water days".

The preferred embodiment of our irrigation controller will support two primary modes of manual operation. The first mode is to run a single valve station. The second mode is to run an entire group of valve stations. By manually depressing the "ONE STATION" key 74, the operator can cause the first valve station with any manual run time to begin watering, Immediately after depressing the "ONE STATION" key 74, the operator may press the "A/B" key 68 to select the program, or use the cursor control keys 56, 58, 60 and 62 to increase or decrease run time or change the active station. There will be a four second delay prior to actually generizing the valve to allow for these changes.

The operator may manually depress the "ALL STATIONS" key 76 (FIG. 3) to initiate sequenced irrigation for all valve stations. After pressing the "ALL STATIONS" key, the operator again has four seconds to change the program or advance the valve station number or change the run time. The stations will automatically sequence running all repeat cycles just as if the start time has been elapsed.

The "END/CANCEL" key 78 (FIG. 3) may be manually depressed during an ongoing scheduled irrigation and the word "PAUSE" will be indicated on the LCD display 28. Depressing the "END/CANCEL" key 78 again will restart the irrigation where it left off. Pressing any key other than the "END/CANCEL" key after irrigation has been paused will cause the rest of the irrigation to be lost. If irrigation is paused and the next day's start time elapses, then that day's irrigation will begin and the operator can no longer restart the irrigation that the operator paused. Depressing the "END/CANCEL" key 78 during manually initiated irrigation will cause the irrigation to be terminated and all remaining time lost. Depressing the "END/CANCEL" key 78 during any of the setup, functions leaves the setup, accepts any changes, and causes the display 28 to return to its normal state.

Depressing the "END/CANCEL" key 78 during a "rain off" condition (as opposed to a "rain off sensor" condition) will cancel the "rain off" condition, return the operating state of the irrigation controller to ON, and return the display to its normal state. Depressing the "END/CANCEL" key 78 during a "rain off sensor" condition has no effect.

Depressing key 80 (FIG. 3) with the umbrella and rain drop graphic symbols thereon disables the irrigation controller and causes the words "RAIN" and "OFF" to be displayed. When this is done, no scheduled irrigation will occur. This feature can be used to manually disable irrigation when no rain sensor is present or during the winter. Manual irrigation can still take place even when the rain feature is activated. After the manual irrigation is complete, the display again will show the words "RAIN" and "OFF". The rain key 80 works as a toggle between the OFF and NORMAL conditions of the irrigation controller. Therefore, to re-enable the irrigation controller, the operator simply depresses the key 80 once again.

The SEASONAL ADJUST "+" and "−" keys 82 and 84 (FIG. 3) allow a quick and easy way for the operator to adjust all run times based on the change of seasons or weather conditions. Each time the "+" key 82 is depressed, run times are increased by ten percent of their one hundred percent run time. Each time the "−" key 84 is depressed, run times are decreased by ten percent of their one hundred percent run time. The vertical bar graph 86 (FIG. 2) on the left side of the LCD display 28 automatically displays the selected range for seasonal variance between ten percent and one hundred and fifty percent. The effect of this adjustment on run time can be seen by pressing the "STATION" key 66 to view the run time for a particular valve station and then using the SEASONAL ADJUST pushbuttons 82 and 84 to increase or decrease all run times. The ability to display the new run time is a unique feature which operators will find particularly convenient.

The start time is a parameter which is specified for each program and defines when irrigation will begin. When the current time equals the start time, the scheduling algorithm commences. "No water days" is a global parameter which affects all stations, and may never be violated by scheduled irrigation. Manually initiated irrigation may occur on "no water days". At the scheduled start time, a check is made to see if the present day is a "no water day". If it is, then all irrigation is suspended for that day. Irrigation for those days that were scheduled to water will occur on the next day that is not a "no water day", unless the station is set to water everyday, in which case that day's watering will be lost.

Each station may independently be assigned up to fourteen cycles. At the start time, the first station in numeral order with a run time not equal to zero will begin watering for that run time. When it completes, the next station with a non-zero run time will start, and water for its run time. This process will continue until all stations have run. At that time, the controller goes back to station number one and checks if it has more than one cycle associated with it. If it does, it checks to see if the time since station number one last stopped watering is greater than or equal to the cycle delay time (one-half hour). If it is, then the second cycle for station number one begins and it again waters for its run time. If the cycle delay time has not elapsed, the irrigation will be delayed until it has. If station number one did not have any additional cycles to run, the controller goes to station number two and checks for any remaining cycles. This process continues until all stations have run for all of their cycles.

An operator may unknowingly schedule more than twenty-four hours of irrigation for one day. This condition will probably not occur everyday, but may occur on days when the various watering intervals line-up. The problem here is that "yesterday's" watering runs past "today's" start time. The controller will deal with this by delaying "today's" start time until "yesterday's" watering has ended. The case where a manually initiated irrigation cycle runs past a start time, is dealt with the same way, i.e., the start time will be delayed. If the new "delayed" start time falls on a "no watering day", no irrigation will occur. If two programs happen to overlap, either due to coincidence or close start times, the second program's start will be delayed until the first program has ended.

The operational software of the preferred embodiment of our improved irrigation controller is divided into modules which are illustrated graphically in FIG. 4–7. The main program module 88 (FIG. 4) initializes the irrigation controller, then repeats the cycle of looking for keyboard input, handling time-out, starting manual watering, checking the rain sensor, and scheduling irrigation. The initialization module 90 initializes the clock control, timers, I/O ports, interrupts, RAM, and LCD memory with default values. The display status module 92 displays the current status of the controller. The status information that is displayed includes whether the rain sensor is ON or the rain key 80 is depressed, whether scheduled or manual irrigation has been selected, and whether watering is in progress, delayed because of cycle delay time, finished or paused.

The blinking module 94 (FIG. 4) toggles the item at the cursor position to produce a blinking effect. The display digit module 96 causes a number to be indicated on the LCD display 28.

Figure 5:
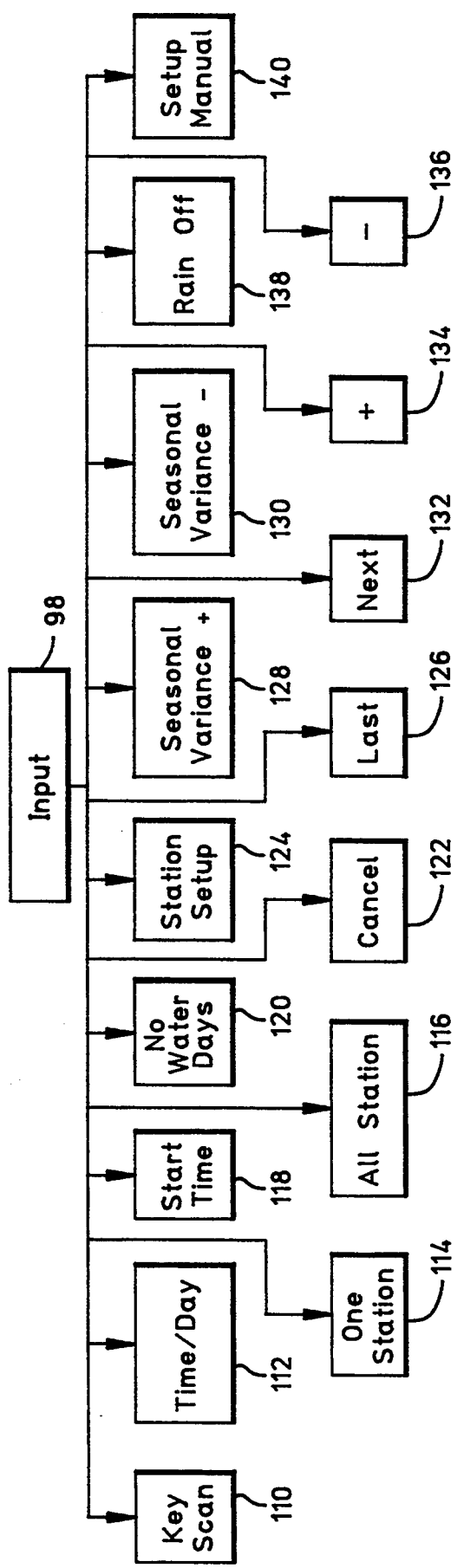

The input module 98 responds to the manual depression of one of the fifteen keys 54. The input module 98 has numerous sub-modules which are illustrated in FIG. 5 and described later on. The time-out module 100 (FIG. 4) leaves the setup operation and goes back to a normal display. The manual start delay passed module 102 starts manual watering if the selected valve station has any run time remaining. The rain sensor module 104 disables the irrigation controller from watering when the rain sensor 50 (FIG. 1) is wet. The LCD display 28 displays "SENSOR OFF". The normal operation will be resumed when the rain sensor drys.

The start time passed module 106 sets up a start-time passed flag, lets the controller out of an auto-pause mode, and decrements the days-left of each programmed valve station. The irrigation module 108 (FIG. 4) controls the scheduled and manual irrigation.

Referring to FIG. 5, there are a number of sub-modules that make up the input module 98. The key scan sub-module 110 scans the matrix of fifteen keys 54 that make up the keypad 24. The time/day sub-module 112 sets the hour, minute, a.m./p.m., and the day of the week. The one station sub-module 114 terminates scheduled irrigation for that day and gets ready to run a selected station manually. The all station sub-module 116 terminates scheduled irrigation for that day and gets ready to run all selected stations one after another manually. The start time sub-module 118 sets the time (hour, minute, and a.m./p.m.) when irrigation will begin and the delay time between each cycle. There is only one start time and cycle delay time for the entire set of stations.

The no water days sub-module 120 sets the days that irrigation is not allowed to occur. The cancel sub-module 122 either stops any irrigation for that day, or leaves any current setup activity and returns to the normal display.

The station setup sub-module 124 reviews or modifies the scheduled irrigation parameters of each station. The maximum number of stations in the preferred embodiment is nine. It also sets the duration in hours and minutes of each cycle. The maximum cycle time of the preferred embodiment is twelve hours and fifty-nine minutes. The station setup sub-module 124 also sets the number of cycles to run in a day. The maximum number of cycles in the preferred embodiment is fourteen. The station setup sub-module 124 further determines the number of days between watering for a station. If the value is one, the station will water everyday. The maximum value for the preferred embodiment is fourteen days. Finally, the station setup sub-module 124 determines the next watering day which can be changed if it is less than eight hours from today.

The last sub-module 126 (FIG. 5) moves the cursor to the previous position. The cursor position is indicated by a flashing item on .the LCD display 28. The seasonal variance+sub-module 128 changes the scheduled cycle time of all of the valve stations according to seasonal variation. Each step increases cycle time by ten percent. The vertical bar graph 86 (FIG. 2) on the LCD display 28 indicates the position of the variation adjustment. The seasonal variance−sub-module 130 (FIG. 5) changes the scheduled cycle time of all of the valve stations according to seasonal variation. Each step decreases cycle time by ten percent. The vertical bar graph 86 (FIG. 2) on the LCD display 28 indicates the position of the variation adjustment.

The next sub-module 132 (FIG. 5) moves the cursor to the next position. The cursor position is indicated by a flashing item on the LCD display 28. The "+" sub-module 134 increases numeric values. It can also select a flashing item in a list. The "−" sub-module 136 decreases numeric values. It can also de-select a flashing item in a list. The rain off sub-module 138 disables the controller for watering during rainy periods. The LCD display 28 indicates "RAIN OFF". This feature is selected by depressing key 80 (FIG. 3). The normal operation of the irrigation controller will be resumed when key 80 is depressed again.

The setup manual sub-module 140 (FIG. 5) reviews or modifies the manual irrigation parameters of each valve station. It also selects a valve station. The maximum number of valve stations of the preferred embodiment is nine. It also selects the duration (hours and minutes) of each cycle. The maximum cycle time of the preferred embodiment is twelve hours and fifty-nine minutes. The setup manual sub-module 140 also repeats the cycles according to the number of cycles to be run in a day. The maximum number of cycles of the preferred embodiment is fourteen.

The main irrigation module 108 (FIG. 6) is broken into two sub-modules including the scheduled irrigation sub-module 142 and the manual irrigation sub-module 144. Under the scheduled irrigation sub-module 142, the irrigation controller handles irrigation scheduling on a daily basis. If today is a no water day, and the rain sensor is ON, or the rain off key 80 is depressed, then no irrigation is scheduled. Otherwise, at the indicated irrigation start time, the first station with any run time that is scheduled for that day will run. Comparing the number of days since the station last ran and the number of days set by the frequency, a station is scheduled to run if the proper number of days has passed since the last run. When that station finishes, the next station (in numeric sequence) with any run time remaining for that day will run. This process continues until all stations with run times for that day have run once. Then a check is made to see if one hour has elapsed since the first station finished. If so, and the first station has an additional cycle to run, it will start. If less than one hour has passed, the irrigation controller will wait until an hour has passed. Then the first station is checked, and any repeat cycle can be started. After the repeat cycle for the first station is complete, a check is made of the elapsed time since the next station in the sequence ran. If an hour has not passed, the irrigation controller will delay, otherwise it will begin the repeat cycle. This process continues until all stations have finished all cycles for that day.

Under the manual irrigation sub-module 144 (FIG. 6), when a station finishes, the irrigation controller goes back to scheduled irrigation the next day if it is running one station manually. Otherwise, the next selected station (in numeric sequence) with any run time remaining will run. This process continues until all stations with run times have run once. Then a check is made to see if one hour has elapsed since the first selected station finished. If so, and the first selected station has an additional cycle to run, it will start. If less than an hour has passed, the controller will wait until an hour has passed. Then the first selected station is checked, and any repeat cycle can be started. After the repeat cycle for the first selected station is complete, a check is made of the elapsed time since the next scheduled station in the sequence ran. If an hour has not passed, the controller will delay, otherwise, it will begin the repeat cycle. This process continues until all selected stations have finished all cycles for that day.

Figure 7:
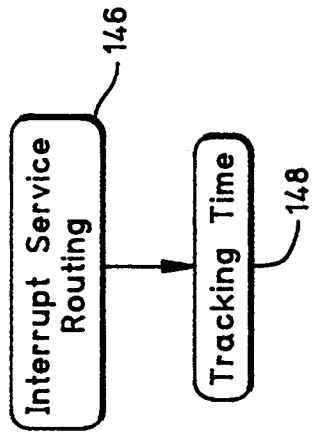
Figure 6:
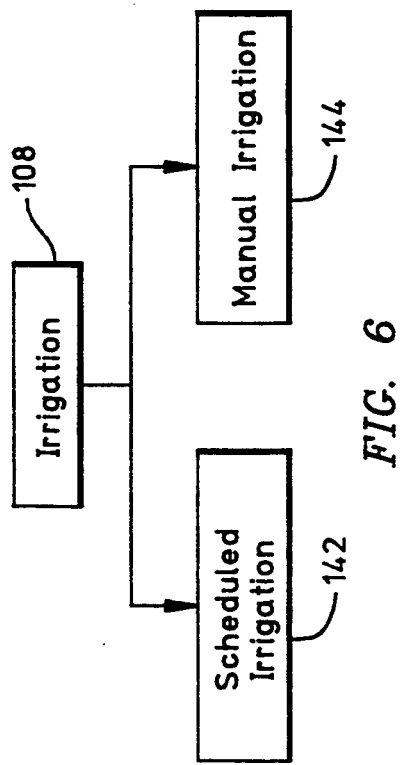

Referring to FIG. 7, the interrupt service routine module 146 occurs when the rain key 80 has been depressed. The LCD display 28 indicates "RAIN OFF". The normal operation of the irrigation controller will be resumed when the key 80 is depressed once again. The time tracking module 148 keeps track of the time and day.

Details of the operational software of our preferred embodiment are described in the extensive pseudo code listing set forth hereafter.

While we have described a preferred embodiment of our improved irrigation controller in detail, it will be apparent to those skilled in the art that our invention may be modified in both arrangement and detail. For example, it would be desirable, when the microcomputer 10 shuts off one of the nine valves, to turn it OFF, then ON, and then OFF for good. Many pressure regulating valves in irrigation systems can become clogged during operation. The OFF-ON-OFF shutdown sequence flushes the valve of any dirt. Therefore, the scope of protection afforded our invention should only be limited in accordance with the following claims.

We claim:

1. An irrigation controller for selectively turning ON and OFF each of a plurality of sprinkler valve stations located around a lawn or garden, comprising:

means for permitting manual entry of a plurality of commands for programming a run time, number of cycles per day and frequency of operation of each of the sprinkler valve stations and for permitting manual entry of at least one start time for the entire set of sprinkler valve stations;

processor means connected to the entry means for receiving the commands and the start time and for sequentially energizing and de-energizing each of the plurality of sprinkler valve stations in accordance with a predetermined schedule that accommodates the commands and start time, said processor means including means for automatically calculating and executing a new schedule when a new start time is programmed for the entire set of the sprinkler valve stations: and display means connected to the processor means for indicating the start time and commands for each of the sprinkler valve stations with a plurality of alphanumeric signs.

2. An irrigation controller according to claim 1 wherein the entry means also permits entry of no water days for the entire set of sprinkler valve stations and wherein the processor will suspend energizing the sprinkler valve stations on the no water days and will execute the predetermined schedule on the remaining days.

3. An irrigation controller according to claim 1 wherein the entry means permits entry of one or more seasonal variance commands each of which causes the processor means to adjust the run times for the entire set of sprinkler valve stations by a predetermined amount of time.

4. An irrigation controller according to claim 3 wherein the display also indicates a vertical bar graph that shows the amount of time corresponding to the number of seasonal adjust commands that have been entered.

5. An irrigation controller according to claim 1 wherein the entry means permits entry of an alternate program of run time, number of cycles per day and frequency of operation of each of the sprinkler valve stations and permits manual entry of a second start time for the entire set of sprinkler valve stations and further wherein the processor means will also sequentially energize and de-energize each of the plurality of sprinkler valve stations in accordance with an alternate schedule that accommodates the alternate program and second start time.

6. An irrigation controller according to claim 5 wherein the processor will delay execution of the alternate schedule until completion of execution of the predetermined schedule where the two schedules overlap.

7. An irrigation controller according to claim 1 wherein the entry means also permits entry of a RAIN OFF command that causes the processor to suspend the predetermined schedule.

8. An irrigation controller according to claim 7 wherein the entry means also permits entry of an END/CANCEL command that causes the processor to resume the predetermined schedule it if has been suspended by the RAIN OFF command.

9. An irrigation controller according to claim 1 wherein the entry means also permits entry of a ONE STATION command that will cause the processor to energize only a selected sprinkler valve station in accordance with the programmed run time, number of cycles and frequency.

10. An irrigation controller according to claim 3 wherein the display means also indicates the adjusted run times in numeric form.

* * * * *

UNITED STATES PATENT AND TRADEMARK OFFICE
CERTIFICATE OF CORRECTION

PATENT NO. : 5,444,611
DATED : August 22, 1995
INVENTOR(S) : Woytowitz, et al

It is certified that error appears in the above-indentified patent and that said Letters Patent is hereby corrected as shown below:

Column 10, line 61, insert the following pseudo code:

Signed and Sealed this

Twentieth Day of February, 1996

Attest:

BRUCE LEHMAN

*Attesting Officer*  *Commissioner of Patents and Trademarks*

Data Structures station-record = record of minute: 0..59 hour: 1..12 cycles: 1..14 delay: 0..15 (0 - 30 minutes)

seasonal-adjust (seasonal adjust level when the hour and minute of this station modified): 1..15 days-left: 0..14 days frequency: 1..14 days time-record = record of minute: 0..59 hour: 1..12 am/pm: 0-am, 1-pm cycle-time = record of minute: 0..59 hour: 1..12

Variables work: 4 4-bit area to store key-matrix input key: a number corresponding to key-matrix input last-key: last time key-matrix input found-input: a flag which is set when a valid input is found chattering: a flag which is set when a different input is received during key matrix scan chattering-count: chattering counter repaint: a flag which is set to show the item at the cursor position before moving the cursor minute-changed: a flag which is set when a minute has passed station-failed: a flag which is set when the station's cycle-time is zero, cycles-per-day smaller than cycle, or days-left is not zero; and when the station is not larger than number-of-stations program-a-start-time-passed: a flag which is set when the start time of program A has passed program-b-start-time-passed: a flag which is set when the start time of program B has passed program-started: a flag which is set when program B is started and is reset when program A is started during scheduled irrigation program-a-in-action: a flag which is set when program A is started (in auto-run, auto-delay, and auto-pause mode) and reset when program B finishes program-b-in-action: a flag which is set when program B is started (in auto-run, auto-delay, and auto-pause mode) and reset when program B finishes program: a flag which is set when program B is selected and is reset when program A is selected power: a flag which is set when the system is turned on and no input has been entered holding: a flag which is set when a key is holding down two-minutes: a flag which is set when two minutes passed interval-passed: a flag which is set when basic interval timer interrupt occurs time-out: delay before entering normal display manual-start-delay: delay before turning on a station manually manual-start-station: the first active station of manual all station sequence station-to-run: station that is currently running or waiting in auto mode cycle: watering cycle level in auto mode seasonal-adjust: seasonal adjust level station-to-update: station that is currently being modified or reviewed start-half-second: half second at which a station manually started number-of-stations: total number of stations in the system remaining-minute: minute of remaining time remaining-hour: hour of remaining time remaining-time: record of remaining minute and hour adjusted-minute: minute of adjusted station cycle time adjusted-hour: hour of adjusted station cycle time adjusted-time: record of adjusted minute and hour saved-record-to-update: copy of record-to-update second minute hour am/pm time: record of minute, hour, and am/pm day program-a-start-minute: minute of program A start time program-a-start-hour: hour of program A start time program-a-start-am/pm: am/pm of program A start time program-b-start-minute: minute of program B start time program-b-start-hour: hour of program B start time program-b-start-am/pm: am/pm of program B start time start-time: record of start-minute, start-hour, and start-am/pm program-a-station[0..number-of-stations - 1] of station-record program-b-station[0..number-of-stations - 1] of station-record record-to-update: pointer to a station to be updated record-to-run: pointer to a station to be run time/day-table[0..9]: cursor position table of time/day display start-time-table[0..2]: cursor position table of start-time display no-water-days-table[0.6]: cursor position table of no-water-days display station-setup-table[0..4]: cursor position table of station display one-station-table[0..2]: cursor position table of one-station display all-station-table[0..4]: cursor position table of all-station display size-of-table[0..6]: sizes of seven cursor position table blink-table: pointer to cursor position table status: current rain mode of system operation[rain-off, rain-sensor, watering]

mode: current mode of system operation [auto-run, auto-delay, auto-finished, auto-pause, manual-start-delay, manual-one-station-run, manual-all-station-run, manual-delay]

state: current state of system operation [time/day, start-time, no-water-days, station-setup, one-station, all-station, normal-display]

cursor: cursor which is indicated by a flashing item [Sunday, Monday, Tuesday, Wednesday, Thursday, Friday, Saturday, arrow, colon, am, pm, station, cycles, frequency, hour, minute]

cursor-index: index of cursor position table no-water-days: bit 0-6 corresponding to Sunday..Saturday

Algorithm

Main Module() initializes the controller. Then it repeats the loop of displaying the information; polling for input, if there is input, resetting time-out counter, manual-start-delay counter, processing it, otherwise leaving setup when time-out counter reaches five minutes, start manual watering when manual-start-delay reaches 3.5 seconds; if one minute has passed, checking rain sensor and start time, calling the appropriate time management function upon current controller mode.

```
    initialization()
    repeat
        updating-time-and-day()
        if there is an input
            time-out = 0
            manual-start-delay = 0
            input()
        else
            bolding = false
            last-key = 0
            last-last-key = 0
            time-out()
            manual-start-delay-passed()
        rain-sensor-handler()
        if minute-changed then
            minute-change = false
            start-time-passed-handler()
            irrigation()
        display()
    until forever
``` initialization() initializes the clock control, timers, I/O ports, interrupts, RAM, and LCD memory with default values.

clear ram bank 0 & 1 set controller speed mode to 2 initialize port 2, 3.3, 4, 5, and 6 integrate pull-up resistor for port 7, 3, and 0 set port 3.3 & 6 in output mode set port 2 & 4-5 in output mode select port 7 input causes INT2 set INT2 interrupt source to port 7 key-matrix input set LCD mode and control registers if 6/9 station jumper is set number-of-stations = 6 else number-of-stations = 9 if system/subsystem selection input is 1 setup clock timer to subsystem clock else setup clock timer to system clock program-a-start-hour = 1 power = true second = 0(100H - 120)

hour = 12 record-to-update = program-a-station[1]

initialize-table()

record-to-update = program-b-station[1]

initialize-table()

setup cursor position table of each setup display seasonal-adjust = 100% show seasonal adjust drops display()

cursor = hour enable clock timer interrupt enable port 7 interrupt enable interrupts updating-time-and-day() updates the time and day.

if half second passed clock-timer-interrupt-service-routine()

input() gets 4 4-bit input from key matrix, converts them into a number and processes it.

found-input = false repeat key-scan()

select 7.82ms interval for basic interval timer interval-passed = false enable basic interval timer while interval-flag == false end until (found-input)

```
key = 1
for i = 0 to 15 do
    if work.bit i == 1
        break
    else
        key++
if the input is valid
    power = false
    if key <> cancel-key
        if (mode == auto-pause)
            set-days-left()
            mode = auto-finished
        if (key == last-key) and (last-key == last-last-key)
            holding = true
        last-last-key = last-key
        last-key = key
        select 31.3ms interval for basic interval timer
        basic-interval-timer-count = 0
        enable basic interval timer
        if holding == true
            while basic-interval-timer <= 4
            end
        else
            while basic-interval-timer <= 9
            end
        switch key
            15: time/day-key()
```

14: seasonal-adjust_+_or_-_key(+)

13: one-station-key()

12: last-key()

11: start-time-key()

10: seasonal-adjust_+_or_-_key(-)

9: all-station-key()

8: +_or_-_key(+)

7: no-water-days-key()

6: rain-off-key()

5: cancel-key()

4: +_or_-_key(-)

3: station-setup-key()

2: program-a-or-b-key()

1: next-key()

cursor-control-allowed()

if (t <> normal )

switch cursor station:

if state < one-station current-number = station-to-update else current-number = station-to-run cycles: current-number = record-to-update.cycles frequency: current-number = record-to-update.frequency hour: current-number = record-to-update.hour minute: current-number = record-to-update.minute if cursor >= station write(current-number)

time-out() leaves setup display when no key is pressed in 5 minutes.

if (time-out > 5 minutes) and (state < one-station)

state = normal if mode == manual-start-delay mode = auto-finished cursor = hour cursor-index = 1 manual-start-delay-passed() starts a manual station when no key is pressed in 3.5 seconds.

if (( state == one-station) or (state == all-station)) and (manual-start-delay > 3.5 seconds)

manual-start-station = station-to-run if program == A program-started = a for i = 1 to number-of-stations do program-a-station[i].delay = 0 else program-started = b for i = 1 to number-of-stations do program-b-station[i].delay = 0 cycle = i if state == one-station if record-to-update.cycle-time <> 0 start-manual-station()

```
            else mode = auto-finished else next-station-to-run()

if station-to-run > number-of-stations mode = auto-finished else start-manual-station()

state = normal
``` rain-sensor-handler() sets the controller to rain-sensor status if rain-off is not on.

```
if rain sensor is on if status <> rain-off status = rain-sensor if (mode <= auto-delay) or (mode == auto-pause)

set-days-left()

if (mode <= auto-pause) and (state == normal)

stop station-to-run mode = auto-finished else if status = rain-sensor status = watering
``` start-time-passed-handler() sets up the start-time-passed flag, lets the controller out of the auto-pause mode, and decrements the *days-left* field of each station.

if current-time == program-a-start-time if (today is not a no-water-day) and (status == watering)

set program-a-start-time-passed flag if mode == auto-pause mode = auto-finished for i = 1 to number-of-stations do if program-a-station[i].days-left <> 1 program-a-station[i].days-left-- if current-time == program-b-start-time if (today is not a no-water-day) and (status == watering)

set program-b-start-time-passed flag if mode == auto-pause mode = auto-finished for i = 1 to number-of-stations do if program-b-station[i].days-left <> 1 program-b-station[i].days-left-- irrigation() handles irrigation scheduling.

if mode <= auto-finished decrement-delay-counter()

new-auto-minute()

else if mode > manual-start-delay decrement-delay-counter()

new-manual-minute()

display() shows the current status of the controller. The information includes whether rain sensor is on or rain button is pressed; which program is selected; whether scheduled or manual irrigation is selected; whether watering is in progress, delayed because of cycle delay time, finished, or paused.

```
if half-second-passed == 0 half-second-passed = 1 if holding = false repaint = false blink()

repaint = true if second-passed = 0 second-passed = 1 else second-passed = 0 if state == normal saved-cursor = cursor saved-current-number = current-number clear-LCD()

switch mode manual-one-station-run:

manual-all-station-run:

show 'MANUAL' running-display()

manual-delay:

show 'MANUAL' delay-display()

auto-finished:
```

```
                switch rain
                    rain-off: show 'RAIN OFF'
                    rain-sensor: show 'SENSOR OFF'
                    no-rain: normal-display()
            auto-run: running-display()
            auto-delay: delay-display()
            auto-pause:
                show 'PAUSE'
                station-display(station-to-run)
        current-number = saved-current-number
if (state == start-time) or (state == station-setup) or (state == one-station) or (state == all-station)
    show 'PROGRAM'
    if program == A
        hide 'B'
        show 'A'
    else
        hide 'A'
        show 'B'
if (state == normal) and (mode > manual-start-delay)
    show 'PROGRAM'
    if program-started = A
        hide 'B'
        show 'A'
    else
        hide 'A'
        show 'B'
``` initialize-table() sets station irrigation parameters to default values.

for (i = 1; i <= number-of-stations; i++)

if program == a record-to-update.minute = 6 record-to-update.cycles = 3 else record-to-update.minute = 1 record-to-update.cycles = 1 record-to-update.seasonal-adjust = 10 record-to-update.frequency = 1 record-to-update.days-left = 1 record-to-update++ clear-LCD() clears all LCD display except seasonal adjust.

cursor = colon for (address = beginning of LCD memory; address < seasonal adjust address in LCD memory;

address++)

content of address = 0 running-display() is called when a station is running. It displays the station number that is running, remaining time, and remaining cycles.

record-to-update = remaining minute hour-minute-display(record-to-update)

show 'REMAINING TIME' show 'RUNNING' if mode == manual-one-station-run blink-table = one-station-table else if mode == manual-all-station-run blink-table = all-station-table show 'AND CYCLES' repaint(cycles)

write(record-to-run.cycles - cycle)

station-display(station-to-run)

if mode == auto-run cursor = colon else cursor = saved-cursor repaint(new-cursor) display the item at the current cursor position and set a new cursor position.

disable interrupt if power == false blink()

cursor = new-cursor enable interrupt station-display(station-number) displays station number.

show 'STATION' repaint(station)

write(station-number)

write(number) display a number.

disable interrupt

LCD-location()

if cursor != minute display-digit(number)

else display-digit(number / 10)

display-digit(number mod 10)

enable interrupt

LCD-location() calculates LCD memory address of a number.

LCD-address = LCD-memory-base + 4 + (cursor - 10) * 2 display-digit(digit) displays a digit.

segments = segment-table[digit]

show segments at LCD-address hour-minute-display(record) displays hour and minute.

repaint(minute)

write(record.minute)

repaint(hour)

show colon write(record.hour)

delay-display() is called when watering is delayed because of cycle delay time.

show 'DELAY' station-display(station-to-run)

normal-display() is called when watering is finished.

hour-minute-display(time)

am/pm(time)

show day repaint(colon)

am/pm(record) displays 'AM' or 'PM'.

if record.am == 0 hide 'PM' show 'AM' cursor = am else hide 'AM' show 'PM' cursor = pm decrement-delay-counter() decrements delay counter every two minutes.

if two-minutes-passed == true two-minutes-passed = false for i = 1 to number-of-stations do if program-started == A if program-a-station[i].delay <> 0 program-a-station[i].delay-- else if program-b-station[i].delay <> 0 program-b-station[i].delay-- else two-minutes-passed = true set-days-left() assigns the *frequency* of each station to its *days-left* and reset program in action flag for (i = 1; i <= number-of-stations; i++)

if program-started == a if program-a-station.days-left == 1 program-a-station[i].days-left = program-a-station[i].frequency program-a-in-action = false else if program-b-station.days-left == 1 program-b-station[i].days-left = program-b-station[i].frequency program-b-in-action = false basic-interval-timer-interrupt-service-routine() disables basic interval timer.

basic-interval-timer-count++ interval-passed flag = true disable basic interval timer key-scan() scans the key matrix, and waits after chattering to get 4 4-bit input.

chattering = false set initial key matrix polling signal to port 4 i = 3 repeat get input from port 7 if work[i] <> input chattering = true work[i] = input rotate key matrix polling signal right 1 bit i-- until key scan completion if chattering chattering-count = 0 else chattering-count++ if chattering-count == 3 found-input = true return work time/day-key() sets the hour, minute, am/pm, and the day of the week.

clear-LCD()

state = time/day record-to-update = time show 'TIME' cursor-index = 0 blink-table = time/day-table am/pm(record-to-update)

show day hour-minute-display(record-to-update)

start-time-key() gets ready to set the time (hour, minute, and am/pm) when irrigation will begin clear-LCD()

state = start-time if program == A record-to-update = program-a-start-time else record-to-update = program-b-start-time cursor-index = 0 blink-table = start-time-table show 'START TIME' am/pm(record-to-update)

hour-minute-display(record-to-update)

no-water-days-key() gets ready to set the days that irrigation is not allowed to occur.

clear-LCD()

state = no-water-days cursor-index = 0 blink-table = no-water-days-table cursor = Sunday show 'NO WATER' show 'SUN   TUE   WED   THU   FRI   SAT' show no water days underlines station-setup-key() gets ready to modify irrigation parameters of station one.

station-to-update = 1 station-setup()

station-setup() gets ready to modify station irrigation parameters.

if program == A record-to-update = program-a-station[station-to-update]

else record-to-update = program-b-station[station-to-update]

clear-LCD()

state = station-setup cursor-index = 0 blink-table = station-setup show 'CYCLE TIME' frequency-display()

next-water-day-display()

cycle-time-adjust(record-to-update)

saved-record-to-update = record-to-update record-to-update = adjusted-time convert-minutes-into-hours-minutes(new-time, record-to-update)

hour-minute-display(record-to-update)

record-to-update = saved-record-to-update cycles-display()

station-display(record-to-update)

cycles-display() displays cycles.

show 'CYCLES PER DAY' repaint(cycles)

write(record-to-update.cycles)

frequency-display() displays frequency.

show 'FREQUENCY' repaint(frequency)

write(record-to-update.frequency)

next-water-day-display() displays a day if it is in next 7 days otherwise the arrow. Display a arrow if the selected program's start time is zero. Decrement the next water day if the current time is less than the selected program's start time, set the next water to today if the selected program is in action.

show 'NEXT WATER'

```
temporary1 = record-to-update.days-left
if program == A
    if program-a-start-hour == 0
        temporary1 = 10
    if time < program-a-start-time
        if temporary1 <> 0
            temporary1--
    else
        if program-a-in-action == false
            if temporary1 == 0
                temporary1++
else
    if program-b-start-hour == 0
        temporary1 = 10
    if time < program-b-start-time
        if temporary1 <> 0
            temporary1--
    else
        if program-b-in-action == false
            if temporary1 == 0
                temporary1++
if temporary1 <= 7
    temporary2 = 0
    repeat
        if no-water-days.((day + temporary1) mod 7)
            temporary1++
        else
```

```
            temporary2 = 1
    until (temporary2 == 1) or (temporary1 > 7)
if temporary1 > 7
    hide days
    display arrow
else
    hide arrow
    show ((day + temporary1) mod 7)
``` cycle-time-adjust(record) sets new-time to the modified station cycle-time according to seasonal adju level.

```
t = convert-hours-and-minutes-into-minutes(record)
time = t
while (seasonal-adjust != 1)
    time = time ÷ t
    seasonal-adjust--
new-time = 0
t = record-to-update.seasonal-adjust
while (time >= t)
    new-time++
    time = time - t
if time >= t/2
    new-time++
``` show seasonal-adjust else if seasonal-adjust <> 1 seasonal-adjust = seasonal-adjust - 1 hide seasonal-adjust if state == station-setup station-setup()

rain-off-key() disables the controller from watering. The LCD displays 'Rain Off'. The normal operation will be resumed when this button is pressed again.

if (status == rain-off) and (mode == auto-finished) and (state == normal)

status = watering else turn-off()

status = rain-off if (mode == auto-run) or (mode == auto-delay)

set-days-left()

mode = auto-finished state = normal program-a-start-time-passed = false program-b-start-time-passed = false turn-off() turns off the station.

start-half-second = 100H - 120 turn off station-to-run program-a-or-b-key() selects program A or B.

if (state == start-time) or (state == station-setup) or (state == one-station) or (state == all-station) or ((state == normal) and (mode > manual-start-delay))

if program == A program = b else program = a switch (state)

start-time: start-time-key()

station-setup: station-setup()

normal:

if (state == normal)

if (mode > manual-one-station)

state = all-station else state = one-station ready-manual()

default:

ready-manual()

one-station-key() terminates scheduled irrigation for that day and gets ready to run a selected station manually.

station-number-for-one-station()

ready-for-one-station()

station-number-for-one-station() finds a station to run when one-station button is pressed if (state == one-station) or (mode == manual-one-station-run)

next-station(station-to-run)

else station-to-run = 1 next-station(station) gets next station.

if station == number-of-stations station = 1 else station++ last-station(station) gets previous station.

station-- if station == 0 station = number-of-stations ready-for-one-station() gets ready to run one station state = one-station blink-table = one-station-table ready-manual()

ready-manual() gets ready for manual irrigation.

clear-LCD()

stop station-to-run if (mode == auto-run) or (mode == auto-delay)

set-days-left()

mode = manual-start-delay if program == A record-to-run = program-a-station[station-to-run]

else record-to-run = program-b-station[station-to-run]

get-remaining-time()

cursor-index = 0 show 'CYCLE TIME' hour-minute(record-to-update)

station-display(station-to-run)

get-remaining-time() gets the remaining time.

cycle-time-adjust(record-to-run)

record-to-update = remaining-time convert-minutes-into-hours-minutes(new-time, record-to-update)

all-station-key() terminates scheduled irrigation for that day and gets ready to run all selected stations one after another manually.

station-number-for-all-station()

ready-for-all-station()

station-number-for-all-station() finds a station to run when all-station button is pressed if (state == all-station) or (mode == manual-all-station-run) or (mode == manual-delay)

next-station(station-to-run)

else station-to-run = 1 ready-for-all-station() gets ready to run all stations state = all-station blink-table = all-station-table ready-manual()

cancel-key() either pauses any scheduled irrigation of the selected program for that day, cancels manual irrigation, or leaves any current setup activity and returns to the normal display.

if state <> normal state = normal cursor = hour cursor-index = 1 if mode == manual-start-delay mode = auto-finished else switch mode auto-run:

auto-delay:

stop station-to-run mode = auto-pause auto-finished:

if status == rain-off status = watering auto-pause:

if remaining-time <> 0 mode = auto-run turn-on()

else mode = auto-delay default (manual-one-station-run, manual-all-station-run, manual-delay):

stop station-to-run mode = auto-finished

<u>turn-on()</u> turns on the station.

state = normal start-half-second = second minute-changed = false turn on station-to-run <u>next-key()</u> moves the cursor to the next cursor. Cursor position is indicated by a flashing item on the LCD cursor-control-allowed()

if (t <> normal)

cursor-index++

>    if cursor-index = size-of-table[t]
>
>        cursor-index = 0
>
>    find-cursor()
>
>    if state == station-setup
>
>        if cursor == hour
>
>            saved-record-to-update = record-to-update
>
>            record-to-update = adjusted-time
>
>        if cursor == cycle
>
>            record-to-update = saved-record-to-update find-cursor() gets new cursor value based on cursor-index.

>    repaint(blink-table[cursor-index])
>
>    if cursor == am
>
>        am/pm(record-to-update)
>
>    if (cursor == Sunday) and (state == time/day)
>
>        cursor = day
>
>        show day
>
>        hide Sunday cursor-control-allowed() checks control parameters *state* and *mode* to determine if cursor control keys (+, -, next, last) should function.

>    t = normal
>
>    if (state <> normal)
>
>        t = state
>
>    else if mode == manual-one-station-run) or (mode == manual-all-station-run)

t = mode return t last-key() moves the cursor to the previous cursor. Cursor position is indicated by a flashing item on the LCD.

cursor-control-allowed()

if (t <> normal)

if cursor-index == 0 cursor-index = size-of-table[t]

cursor-indexfind-cursor()

if state == station-setup if cursor == minute saved-record-to-update = record-to-update record-to-update = adjusted-time if cursor == station record-to-update = saved-record-to-update

+ or - key() increases or decreases numeric values. It can also select or de-select a flashing item in a list.

cursor-control-allowed()

if (t <> normal)

if cursor <= arrow update-day()

else

```
switch cursor
    am: update-am(record-to-update)
    pm: update-am(record-to-update)
    station:
        if (station-setup < state)
            if key == +-key
                next-station(station-to-run)
            else
                last-station(station-to-run)
            if (state == one-station)
                ready-for-one-station()
            if (state == all-station)
                ready-for-all-station()
            if (state == normal)
                if (mode > manual-one-station)
                    ready-for-all-station()
                else
                    ready-for-one-station()
        else
            if key == +-key
                next-station(station-to-update)
            else
                last-station(station-to-update)
            station-setup()
    cycles:
        update-number(1, 14)
        record-to-update.cycles = current-number
```

```
frequency:
    record-to-update.days-left = 1
    next-water-day-display()
    update-number(1, 14)
    record-to-update.frequency = current-number
hour:
    if (state == station-setup)
        update-number(0, 3)
    else
        if (state == time/day)
            update-number(1,12)
        else
            update-number(0, 12)
    record-to-update.hour = current-number
    if state == station-setup
        saved-record-to-update.hour = current-number
        saved-record-to-update.seasonal-adjust = seasonal-adjust
minute:
    if key == +_key
        if current-number == 59
            current-number = 0
        else
            current-number++
    else
        if current-number == 0
            current-number = 59
        else
```

```
                        current-number-- record-to-update.minute = current-number if state == station-setup saved-record-to-update.minute = current-number saved-record-to-update.seasonal-adjust = seasonal-adjust
``` update-day() selects or de-selects day.

```
    switch (state)

time/day:

current-number = cursor update-number(0,6)

cursor = current-number day = current-number show day hide 'SUN   MON   TUE   WED   THU   FRI   SAT no-water-days:

update-no-water-day()
``` update-no-water-days() selects or de-selects no water day.

```
    if key == +-key show '_' under cursor no-water-days.bit cursor = 1 else hide '_' under cursor no-water-days.bit cursor = 0
``` update-am(record) changes from 'AM' to 'PM' or from 'PM' to 'AM', and saves the result.

if cursor == am record.am/pm = pm show 'PM' cursor = pm hide 'AM' else record.am/pm = am show 'AM' cursor = am hide 'PM' update-number(minimum, maximum) increments or decrements a numeric value, and saves result.

if key == +-key if current-number == maximum current-number = minimum else current-number++ else if current-number == minimum current-number = maximum else current-number-- start-manual-station(address) tries to start the station passed. If the station's *delay* field is zero, the station is physically started, the remaining-time is set to the station's *cycle-time*, and the mode is set to run. Otherwise the mode is set to delay.

```
if record-to-run.delay == 0 if mode <> manual-start-delay get-remaining-time()

if state == one-station mode = run-one-station else mode = run-all-station turn-on()

else mode = manual-delay
``` new-auto-minute() handles time management and station scheduling when the system is running in the auto mode and the current time of day has changed by one minute.

```
if mode == auto-finished if (status = watering)

if (program-a-start-time-passed == true) or (program-a-start-time-passed == true)

if program-a-start-time-passed == true program-a-start-time-passed = false program-started = a program-a-in-action = true record-to-run = program-a-station[1]

else
```

```
                program-b-start-time-passed = false program-started = b program-b-in-action = true record-to-run = program-b-station[1]

cycle = 1 station-to-run = 1 next-station-to-run()

if station-to-run <= number-of-station start-auto-station()

else if remaining-time <> 0 remaining-time-- if remaining-time == 0 if mode == auto-run turn-off()

record-to-run.delay = 30 minutes station-to-run++ record-to-run++ next-station-to-run()

if station-to-run > number-of-stations cycle++ station-to-run = 1 if program-started == a record-to-run = program-a-station[station-to-run]

else record-to-run = program-b-station[station-to-run]

next-station-to-run()
```

```
if station <= number-of-stations
    if record-to-run.cycle < cycle
        station-failed = true
    if mode <> manual-start-delay
        get-remaining-time()
    if record-to-update.cycle-time == 0
        station-failed = true
    if (mode <= auto-finished) and (1 < record-to-run.days-left)
        station-failed = true
    if station-failed == true
        station-to-run++
        record-to-run++
else
    station-too-large = true
until (station-failed == false) or (station-too-large == true)
if mode <> manual-start-delay
    remaining-time = 0
return station-to-run, record-to-run
```

<u>new-manual-minute()</u> handles time management and station scheduling when the system is running in the manual mode and the current time of day has changed by one minute.

```
if remaining-time <> 0
    remaining-time--
if remaining-time == 0
    if mode <> manual-delay
        turn-off()
``` half-second = 100H - 120 minute++ if minute == 60 then minute = 0 hour++ if hour == 13 hour = 1 if hour == 12 then if am = AM am = PM else am == AM day++ if day == 7 day = 0 if half-second = start-half-second minute-changed = true time-out++ manual-start-delay++ blink() blinks the item at the cursor position when called by the event-timer-interrupt-service-routine, or repaint the item at the cursor position when called by the main program.

if power == true if blank(LCD-address of hour)

hour-minute-display(time)

else reset the data at LCD-address of minute and hour to 0 else if cursor < station then toggle LCD-memory-base.cursor else

LCD-location()

if hour < cursor then if blank(LCD-address) == true then set the data at LCD-address to the data at LCD-segments else reset the data at LCD-address to 0 else if blank(LCD-address) and blank(LCD_address + 2) then set the data at LCD-address to the data at LCD-segments set the data at LCD-address + 2 to the data at LCD-segments + 2 else reset the data at LCD-address to 0 reset the data at LCD-address + 2 to 0 blank(address) returns true if the 8-bit content of address is 0.

if (address == 0) and (address + 1 == 0)

return true if repaint == true return true